United States Patent [19]

Gager, Jr.

[11] 4,269,445
[45] May 26, 1981

[54] WINDSHIELD MOUNTING ASSEMBLY

[76] Inventor: Lawrence J. Gager, Jr., P.O. Box 16212, Jacksonville, Fla. 32216

[21] Appl. No.: 969,084

[22] Filed: Dec. 13, 1978

[51] Int. Cl.³ .............................................. B62J 17/04
[52] U.S. Cl. ................................ 296/78.1; 296/84 A; 403/373
[58] Field of Search ...................... 296/78, 78.1, 84 R, 296/84 A, 89, 90; 280/289 S; 224/30 A, 36, 41, 33 A, 35, 39; 403/188, 187, 191, 386, 373

[56] References Cited

U.S. PATENT DOCUMENTS

| | | | |
|---|---|---|---|
| 2,365,372 | 12/1944 | Allen | 403/187 |
| 3,126,191 | 3/1964 | Holden | 403/373 |
| 3,801,152 | 4/1974 | Tims et al. | 296/78.1 |

FOREIGN PATENT DOCUMENTS

| | | | |
|---|---|---|---|
| 514469 | 10/1952 | Belgium | 296/78.1 |
| 733208 | 7/1955 | United Kingdom | 296/78.1 |

OTHER PUBLICATIONS

Bates Motorcycle Catalog, p. 34, 1967–1968.

*Primary Examiner*—John J. Love
*Assistant Examiner*—Ross Weaver
*Attorney, Agent, or Firm*—Arthur G. Yeager

[57] ABSTRACT

A windshield mounting apparatus comprising pairs of clamp assemblies adjustably connected to elongated supports pivotally clamped to a handlebar. Each clamp assembly comprises a U-shaped clamp including an intermediate portion with a passage for receiving an elongated support and spaced end portions having inner and outer surfaces with a passageway extending therethrough. Clamp end portion inner surfaces define a closeable slot therebetween and each clamp outer surface includes a recessed pocket communicating with the respective end portion passageway. Each clamp assembly also comprises windshield support elements including an elongated insert having a central passageway and an insert end portion disposed in the respective pocket and a compressible windshield supporting element having a passageway and a windshield engaging portion. An elongated connecting element extends through the aligned passageways and includes one end portion engaged with the windshield supporting element and an opposite end portion engaging a connecting means disposed in non-rotatable bearing relationship with the pocket in the respective clamp other end portion.

13 Claims, 5 Drawing Figures

U.S. Patent
May 26, 1981
4,269,445
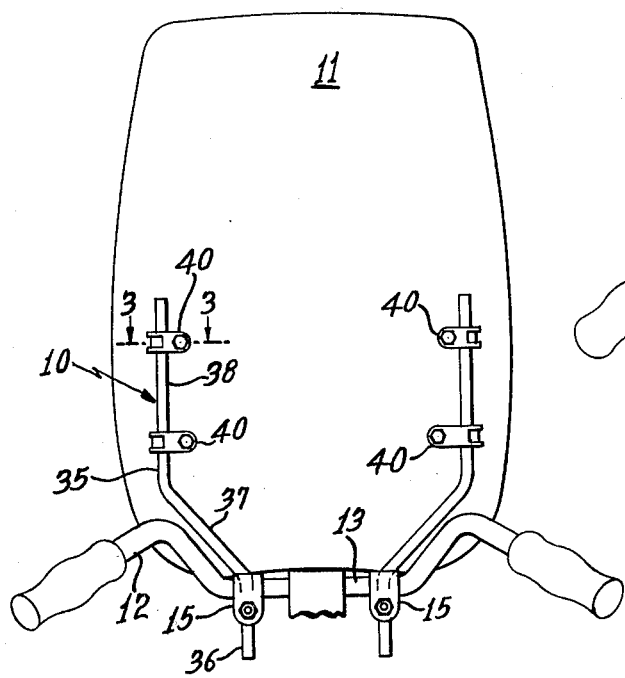
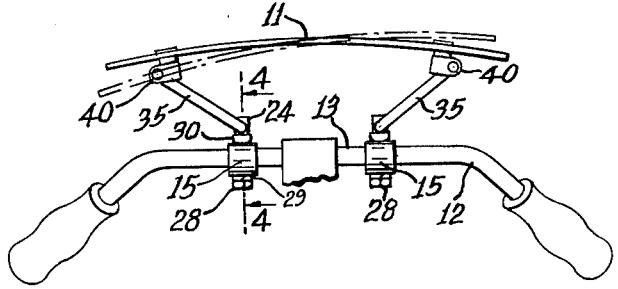
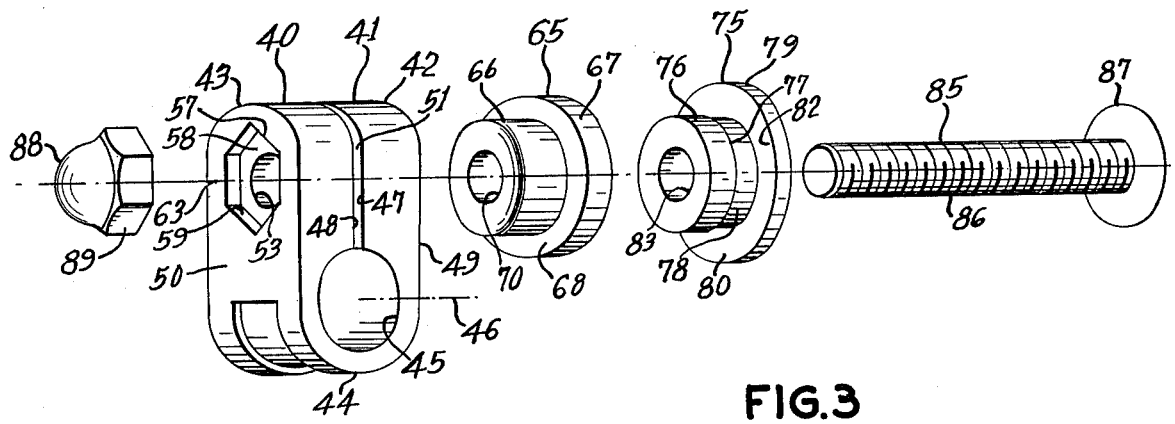
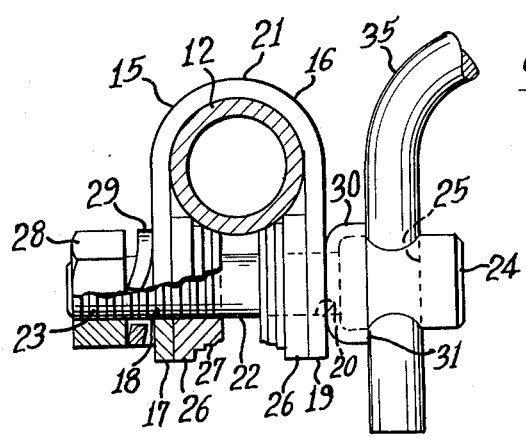
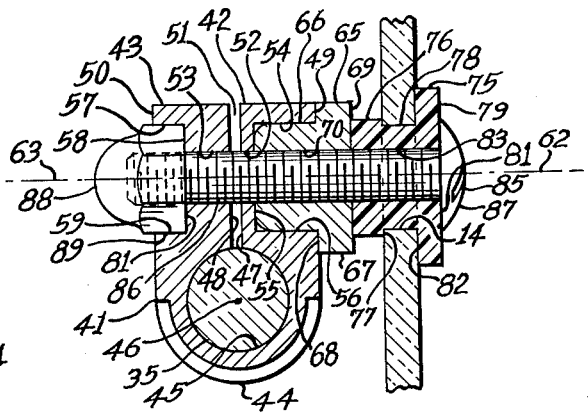

WINDSHIELD MOUNTING ASSEMBLY

BACKGROUND OF THE INVENTION

1. Field of the Invention

The present invention, primarily relates to support assemblies for adjustably mounting a windshield on motorcycles, snowmobiles and like vehicles.

2. Description of the Prior Art

In this modern and increasingly mobile society, many families and individuals own various types of vehicles such as bicycles, mopeds, motorcycles, snowmobiles and the like. Although different windshield mounting assemblies have been proposed for use on the aforementioned vehicles, there has generally not been a windshield mounting assembly which is universally adaptable for different types of rideable vehicles and also relatively inexpensive, easily adjustable and provides the associated windshield with the degree of support and stability desired and anticipated.

For example, although sturdy windshield mounting assemblies have generally been provided for heavier vehicles such as motorcycles and snowmobiles, such assemblies have tended to be relatively heavy, bulky, expensive and generally non-interchangeable. Additionally, such assemblies have a rather prohibitive application to smaller, lighter vehicles such as bicycles and mopeds wherein not only the maneuverability and operation but also the balance thereof may be adversely affected. Conversely, windshield mounting assemblies commonly applied to bicycles and mopeds are normally lightweight, relatively inexpensive, of simple construction and are not generally designed to withstand severe loading forces commonly associated with high speed vehicles such as motorcycles and snowmobiles which are often driven over irregular and bumpy terrain.

In addition to the design criteria associated with various forces, such as vibrational forces generated when a vehicle intermittently encounters roadway irregularities, a windshield and its accompanying mounting assembly are normally designed so that the windshield will withstand stress concentrations resulting from not only the manner in which the windshield is mounted but also material imperfections and discontinuities such as holes and notches formed therein. For example, when a windshield is deflected by the onrushing air, a complex pattern of stresses are developed therein and it follows that when improperly supported at one or more mounting locations, stress concentrations formed thereabout may result in localized failure of the windshield. Such localized failure is particularly common adjacent windshield mounting holes which generally form weakened zones in the windshield element. As a result, fastening means extending through windshield mounting holes and connected to the adjacent mounting assembly usually include rubber sleeves or cushions to reduce the impact or bearing force transmitted between the mounting assembly and the windshield region adjacent the mounting holes. Although increasing the number of mounting holes will generally distribute the applied loads and thus lessen the effective stresses adjacent individual mounting holes, it has often been difficult to adequately adapt a mounting assembly and its respective plurality of fastening means to windshields of diverse shapes and generally non-planar curved configurations.

Further, it would also be preferable to provide a sturdy, lightweight windshield mounting assembly comprising a selectively adjustable mounting support and a multi-positionable windshield fastening element attached thereto such that windshields of different shapes and sizes can be adequately supported from a vehicle handlebar. Reductions in the cost of a windshield mounting assembly are also important so that such assembly may be economically competitive and affordable to the users of such motorcycles, mopeds and other rideable vehicles.

Windshield mounting assemblies which include windshield fastening means for securing a windshield to a vehicle handlebar are generally disclosed in U.S. Pat. Nos. Re. 23,039, 1,532,008, 2,675,266, 3,801,152 and 3,904,238. The windshield mounting assembly constructed according to the present invention is designed to overcome problems encountered with some of the prior art, such as the non-adaptability for different windshield configurations and the relatively difficult adjustment of the windshield for vertical and horizontal displacements.

SUMMARY OF THE INVENTION

Accordingly, a general aspect of this invention relates to a windshield mounting assembly comprising a pair of spaced handlebar clamps attached to a handlebar, an elongated adjustable support rod attached to each of the handlebar clamps and windshield clamp assemblies mounted on the support rods for adjustably connecting a windshield thereto.

Another aspect of this invention relates to a mounting assembly which includes a pair of spaced clamp assemblies attached to offset portions of each adjustable support rod so that a windshield attached thereto may be adjusted both laterally and vertically with respect to a vehicle handlebar.

A more specific aspect of the present invention relates to a clamp assembly generally comprising a U-shaped clamp including an intermediate portion having a passage for receiving the respective support and spaced end portions including inner and outer surfaces and a passageway extending therethrough wherein the inner adjacent surfaces of the spaced end portions define a closeable slot therebetween. Each clamp assembly further comprises a windshield supporting means attached to each clamp for attaching a windshield thereto and a connecting means connected to the supporting means and extending through the clamp end portion passageways for selectively closing the slot and for inhibiting movement between the clamp and the support rod.

Another specific aspect of this invention relates to a windshield supporting means comprising an elongated insert element including a passageway extending therethrough, a cylindrical insert first end portion disposed in a recessed pocket formed in one end portion of the clamp, and an enlarged insert second end portion having a flange surface abutting the outer surface of the clamp end portion and an end wall spaced therefrom. The windshield supporting means further comprises a windshield engaging element including a passageway extending therethrough, a compressible first end portion disposed in abutting relationship with the insert flat end wall and a second end portion having a bearing surface. Connecting means extends through the end portion passageways, the insert passageway and the aligned windshield engaging element passageway and further includes adjustable shoulder portions engaged with the bearing surface and the clamp other end portion.

Accordingly, it is a general object to provide an efficient, economical windshield mounting assembly for supporting a windshield from a vehicle handlebar.

Another object of the invention is to provide a relatively lightweight yet rigid mounting assembly which may be easily applied and adjusted to various handlebars.

A further object of the present invention is to provide a relatively simple mounting assembly designed to accomodate windshields of diverse sizes and shapes.

A particular object is to provide a mounting assembly which may be assembled and dis-assembled with ease and stored in a compact manner.

Another specific object is to provide multi-positional windshield support elements which permit a windshield to be supported in a wide variety of mounting positions.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

FIG. 1 is a rear elevational view of the mounting assembly connecting a windshield to a vehicle handlebar;

FIG. 2 is a top plan view of FIG. 1;

FIG. 3 is an enlarged cross-sectional view taken along line 3—3 of FIG. 1;

FIG. 4 is an enlarged view, partially broken away, of the handlebar clamp generally taken along line 4—4 of FIG. 2; and FIG. 5 is a separated perspective view of the windshield clamp assembly.

DETAILED DESCRIPTION OF THE PREFERRED EMBODIMENT

Referring now more particularly to the drawings, FIG. 1 generally illustrates a windshield mounting assembly 10 for connecting a windshield 11, which may have a generally planar or a curved configuration, to a handlebar 12 for a small vehicle such as a moped, snowmobile or a motorcycle. More specifically, the mounting assembly 10 comprises a pair of spaced handlebar clamps 15, a support rod 35 connected to each handlebar clamp 15 and a pair of spaced clamp assemblies 40 connected to each support rod 35. Further, each clamp assembly 40 generally includes a U-shaped clamp 41, an insert element 65, a windshield engaging element 75 and a connecting means 85 for maintaining the clamp 41 at a selected orientation on the respective support rod 35 and for connecting windshield 11 thereto.

Each handlebar clamp 15 includes a rigid U-shaped bracket 16 having spaced end portions 17, 19 with respective passageways 18, 20 extending therethrough and an intermediate portion 21 adapted to be positioned in abutting relationship with handlebar 12. Extending through bracket openings 18, 20 is an elongated pin 22 having a threaded end portion 23 and an opposite enlarged end portion 24 with a passage 25 extending therethrough. When mounted on handlebar 12, as shown in FIG. 4, spaced washers 26, which include cylindrical stepped regions 27, are positioned such that edges of stepped regions 27 firmly engage the handlebar 12 as nut 28 and lock washer 29 are tightened against bracket end portion 17. A cup shaped washer 30 with an opening therethrough is mounted on pin 22 and disposed between bracket end portion 19 and pin end portion 24 such that circular edge portions 31 of washer 30 are adapted to maintain support rod 35 in the selected position.

Support rod 35, preferably formed of a rigid metal, includes a lower end portion 36, an upper end portion 38 generally parallel to and offset from end portion 36, and an intermediate portion 37 extending therebetween. Accordingly, as a result of the adjustable nature of the handlebar clamp 15 and the offset configuration of support rod 35, the mounting assembly generally permits windshields of varying dimensions to be adapted to different forms of handlebars. In FIG. 1 for example, handlebar 12 includes a relatively narrow straight portion 13 as compared with the spacing of windshield mounting holes and, as further shown in FIG. 2, the support rods 35 can be rotated in pin passage 25 until the desired spacing between support rod end portions 38 are generally matched with the spacing of windshield holes 14. As is also evident from FIG. 2, the distance between handlebar clamps 15 may also be modified to alter the lateral distance between windshield 11 and handlebar 12.

Attached to support rods 35, as shown in FIG. 1, are pairs of clamp assemblies 40 which generally include a U-shaped clamp 41, an insert element 65, a windshield engaging element 75, and a connecting means 85. U-shaped clamp 41, more particularly shown in FIG. 5 and in cross-section in FIG. 3, comprises spaced end portions 42, 43 and an intermediate portion 44 including a passage 45 with a longitudinal axis 46 extending therethrough and represented by a point in FIG. 3. End portions 42, 44 include respective inner surfaces 47, 48 and outer surfaces 49, 50 wherein inner surfaces 47, 48 of spaced end portions 42, 43 define a closeable slot 51 therebetween. Additionally, clamp end portions 42, 43 are formed with respective passageways 52, 53 wherein the corresponding longitudinal axes 62, 63 of the passageways 52, 53 extend substantially perpendicular to axis 46. The outer surface 49 of clamp end portion 42 includes a recessed pocket 54 having a relatively flat bottom wall 55 and a circular sidewall 56 being spaced from and substantially parallel with the longitudinal axis 62 of passageway 52. Similarly, outer surface 50 of clamp end portion 43 includes a recessed pocket 57 having a relatively flat bottom wall 58 and a plurality of flat bearing surfaces 59 spaced from longitudinal axis 63 of passageway 53. Further, the indented nature of pockets 54 and 57 and passageways 52, 53 permits the clamp 41 to be economically formed such that further machining thereof and deleterious, disadvantageous effects, such as weakened zones formed due to shrinkage and non-uniform curing, are largely prevented.

A windshield supporting means in the form of an insert 65 and windshield engaging element 75 are attached to each clamp 41 for connecting a windshield thereto. Elongated insert or spacer element 65 comprises a first end portion 66, which is preferably cylindrical, adapted to be inserted in and generally conform with pocket 54 such that a flange surface 68 of the relatively enlarged second end portion 67 is placed in abutting relationship with outer surface 49. Additionally, spacer portion or second end portion 67 includes a relatively flat end wall 69 and insert 65 includes central passageway 70 formed therethrough such that passageway 70 remains substantially aligned with passageways 52 and 53 if insert 65 is subsequently rotated or turned in pocket 54. Windshield engaging element 75, preferably formed of a compressible yet elastic material, comprises a compressible first end portion 76 adapted to be disposed in abutting relationship with flat end wall 69 of insert 65 and a second end portion 79 including a flange 80 and a bearing region 81. An intermediate portion 78 extending between end portions 76 and 79 generally comprises a windshield receiving or engaging portion wherein sidewall portions 77, 82 of respective end portions 76, 79 define a windshield receiving channel therebetween as windshield engaging element 75 is compressed by connecting means 85, as shown in FIG. 3. Additionally, windshield engaging element 75 includes a passageway 83 extending therethrough and substantially aligned with insert passageway 70 and clamp end portion passageways 52, 53 for receiving connecting means 85. Although the outside diameters of end portion 76 and intermediate portion 78, in the uncompressed condition, are generally smaller than the diameter of windshield hole 14 to permit the insertion therein, the compression of windshield engaging element 75 by connecting means 85 causes end portion 76 and intermediate portion 78 to expand outwardly. Thus, as shown in FIG. 3, intermediate portion 78 expands to fill windshield hole 14 and end portion 78 expands to define a circular cushion between windshield 11 and insert end wall 69 such that sidewalls 77 and 82 define a windshield receiving channel therebetween.

Connecting means 85, which includes an elongated fastener portion 86 extending through the clamp passageways 52, 53 insert passageway 70 and windshield engaging element passageway 83, is generally designed to selectively close slot 51 and inhibit relative movement between the respective clamp assembly 40 and support rod 35. Connecting means 85 further comprises shoulder portions in the form of head portion 87 integrally formed with elongated fastener portion 86 and side portions 89 on nut 88, wherein head portion 87 is disposed in abutting relationship with bearing region 81 and side portions 89 are disposed in abutting relationship with bearing surfaces 59 in pocket 57.

In use, spaced handlebar clamps 15 are first positioned on a suitable portion of handlebar 12 and, thereafter, a pair of support rods 35 each carrying two clamp assemblies 40 are mounted thereon by inserting respective lower end portions 36 through pin passage 25. Subsequently, a windshield 11 containing a pair of vertically spaced mounting holes 14 is connected to the spaced clamp assemblies 40 by inserting respective portions of windshield engaging elements 75 and connecting means 85 through the windshield holes 14 and tightening the connecting means 85 until each respective clamp assembly 40 is firmly engaged with the respective support rod 35. Preferably, support rods 35 having upper end portions 38 of appropriate diameters will be selected with respect to the diameter of clamp passage 45 such that clamp end portion inner surfaces 47, 48, which define closeable slot 51 therebetween, will remain slightly apart when the connecting means 85 is sufficiently tightened as shown in FIG. 3. Accordingly, any further tightening of the connecting means 85 will tend to primarily compress windshield engaging element 75 which would result in an increased resilient clamping force exerted by clamp 41 on support rod 35. Additionally, relatively easy adjustment of connecting means 85 is generally permitted when insert end portion 66 is dimensioned to rotate in clamp pocket 54 such that a rotational tightening of the connecting means 85 generally results in a likewise rotation of windshield engaging 75 and insert 65 due to friction therebetween. Also, the positionable nature of the handlebar clamps 15 as well as the rotational attributes of support rod 35 and the clamp assembly 40 generally allows the mounting of different windshield configurations in a variety of orientations, as is shown by broken lines in FIG. 2. Further, vertical adjustment of the windshield 11 may be accomplished by moving the clamp assemblies 40 and support rods 35 relative to the handlebar clamp 15.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a windshield mounting assembly, a U-shaped clamp comprising spaced end portions and an intermediate portion including a passage extending therethrough for receiving an elongated support rod therethrough, said passage including a longitudinal axis spaced from said clamp end portions, each of said end portions including a passageway extending therethrough for receiving a windshield connecting and supporting means therethrough, said passageways having aligned longitudinal axes substantially perpendicular to said longitudinal passage axis, each said end portion including inner and outer surfaces, one of said end portions including a recessed pocket provided in said outer surface and communicating with said one end portion passageway, said inner surfaces of said end portions define a closeable slot therebetween and said longitudinal axes of said end portions being substantially coincident, and a windshield connecting and supporting means passing through said passageways and attachable to and through an aligned opening in a windshield positionable closely adjacent to one said end portions.

2. The combination according to claim 1 wherein said pocket includes a bearing surface extending generally parallel with said longitudinal axis of said one end portion passageway and being adapted to engage a shoulder portion of a connecting means attachable to a windshield connecting and supporting means.

3. The combination according to claim 1, wherein said pocket includes a sidewall spaced from and being substantially parallel with said longitudinal axis of said one end portion passageway and adapted to receive a complementary connecting element therein for attachment to a windshield connecting and supporting means.

4. The combination according to claim 1, further comprising an elongated insert element including one end portion being disposed in said pocket and said insert further including a central passage extending therethrough and being generally aligned with said passageway of said clamp one end portion for receiving a windshield connecting and supporting means therethrough.

5. The clamp according to claim 4, wherein said insert includes another end portion having an outwardly extending flange surface disposed in abutting relationship with said outer surface of said clamp one end portion.

6. The clamp according to claim 1, wherein said pocket includes a sidewall spaced from and being substantially parallel with said longitudinal axis of said clamp one end portion passageway and adapted to receive a complementary connecting element therein for attachment to a windshield connecting and supporting means, and said outer surface of said other clamp end portion includes a pocket communicating with said other clamp end portion passageway, said other clamp end portion includes a bearing surface generally parallel with said longitudinal axis of said other clamp end portion passageway and adapted to receive a complementary element therein.

7. A windshield mounting assembly comprising a U-shaped clamp comprising an intermediate portion and spaced first and second end portions, said intermediate portion including a passage extending therethrough, each said end portion including inner and outer surfaces and a passageway extending therethrough, said inner surfaces of said end portions define a closeable slot therebetween and said outer surface of said end portion includes a recessed pocket communicating with said first end portion passageway; an elongated insert element comprising a first end portion being received in said clamp first end portion pocket and a second end portion having a generally flat end wall, said insert further including a passageway extending therethrough and aligned with said clamp first end portion passageway; a windshield engaging element comprising a first end portion disposed in abutting relationship with said insert flat end wall and a second end portion having a bearing region, said windshield engaging element including a passageway extending therethrough and generally aligned with said insert passageway; and connecting means extending through said clamp passageways, said insert passageway and said windshield element passageway for connecting said clamp, said insert and said windshield engaging element together and for selectively closing said slot, said connecting means further including spaced shoulder portions, one of said shoulder portions being disposed in abutting relationship with said bearing region and the other of said shoulder portions being disposed in abutting relationship with said clamp other end portion.

8. The combination according to claim 7 wherein said passage of said intermediate portion includes a longitudinal axis and said end portion passageways each having a longitudinal axis substantially perpendicular with said longitudinal axis of said passage.

9. The combination according to claim 7 wherein said first end portion of said windshield engaging element includes a compressible region, said compressible region and said second end portion of said windshield engaging element include sidewall portions forming a window receiving channel therebetween.

10. The combination according to claim 7 wherein said outer surface of said clamp second end portion includes a recessed pocket having a bearing surface and communicating with said clamp second end portion passageway and said means engageable with said clamp second end portion comprising at least one shoulder portion being disposed in abutting relationship with said pocket bearing surface to inhibit relative movement therebetween.

11. A windshield mounting assembly comprising spaced elongated supports connected to a handlebar and a clamp means attached to each said support, each said clamp means comprising a U-shaped clamp mounted on each of said supports, each said clamp comprising spaced end portions and an intermediate portion including a passage extending therethrough and said passage receiving said respective support, each of said end portions including inner and outer surfaces and a passageway extending therethrough, and said inner surfaces of said end portions define a closeable slot therebetween; a windshield supporting means attached to each said clamp for connecting a windshield thereto; and a connecting element mounting said supporting means to said clamp and extending through said clamp end portion passageways and said windshield supporting means and an opening in a windshield positionable closely adjacent to one said end portions for selectively closing said slot and for inhibiting movement between said respective clamp and support.

12. The combination according to 11, wherein each said clamp including a pocket formed in said outer surface of one of said clamp end portions and said pocket communicating with said respective clamp one end portion passageway, and each said winshield supporting means comprises an elongated insert element including a first end portion disposed in said respective clamp one end portion pocket and a second end portion having a generally flat end wall and said insert further including a passageway extending therethrough and aligned with said clamp one end portion passageway, each said windshield supporting means further comprising a windshield engaging element having a compressible first end portion disposed in abutting relationship with said insert flat end wall and a second end portion having a bearing region, said windshield engaging element including a passageway extending therethrough and generally aligned with said insert passageway, and said connecting element extends through said insert passageway and said windshield engaging element passageway and said connecting element further includes shoulder portions engaged with said windshield engaging element bearing region and said clamp other end portion.

13. The combination according to claim 12 wherein said said clamp means comprises another identical clamp spaced from said clamp and being mounted on said support.

* * * * *